United States Patent

[11] 3,601,802

[72] Inventors Yukio Nakagome;
Saburo Shirai, both of Tokyo-to, Japan
[21] Appl. No. 665,920
[22] Filed Sept. 6, 1967
[45] Patented Aug. 24, 1971
[73] Assignee Kokusai Denshin Denwa Kabushiki Kaisha
Tokyo-to, Japan
[32] Priority Sept. 9, 1966
[33] Japan
[31] 41/59,225

[54] PATTERN MATCHING CHARACTER RECOGNITION SYSTEM
4 Claims, 9 Drawing Figs.

[52] U.S. Cl. ..... 340/146.3Q
[51] Int. Cl. ..... G06k 9/08
[50] Field of Search ..... 340/146.3

[56] References Cited
UNITED STATES PATENTS

| | | | |
|---|---|---|---|
| 2,978,675 | 4/1961 | Highleyman | 340/146.3 X |
| 3,252,140 | 5/1966 | Lemay et al. | 340/146.3 |
| 3,104,371 | 9/1963 | Holt | 340/146.3 |
| 3,184,712 | 5/1965 | Holt | 340/146.3 |
| 3,496,542 | 2/1970 | Rabinow | 340/146.3 |

OTHER REFERENCES

Liu et al., IBM Technical Disclosure Bulletin, " Character Recognition Method Employing Two-Level Decision Process," Vol. 8, No. 6, 11-1965. P. 867.

Stockdale, IBM Technical Disclosure Bulletin, " Image Matching Character Recognition System," Vol. 8, No. 5, 10-1965, pp. 761-763.

*Primary Examiner*—Daryl W. Cook
*Assistant Examiner*—Leo H. Boudreau
*Attorneys*—Robert E. Burns and Emmanuel J. Lobato

ABSTRACT: A pattern matching character recognition system in accordance with pattern matching method, where for each of input characters, a first kind of standard pattern included substantially in all the same named input characters and a second kind of standard pattern including substantially all the same named input characters are previously established for each of the input characters to be recognized, and the names of the respective input characters are determined in consideration of results obtained from respective compare operations between input characters and each of the two kinds of standard patterns.

PRIOR ART

PATTERN MATCHING CHARACTER RECOGNITION SYSTEM

This invention relates to a pattern recognition system and more particularly to a character recognition system in accordance with pattern-matching method.

In the pattern recognition system of the type, the input pattern information of an input character representative of a character to be recognized is compared successively as to all the region of patterns to be compared, with the standard patterns respectively representative of a plurality of standard characters, and one of the standard characters corresponding to the input pattern information is recognized as the result of respective comparisons. In this case of comparing two patterns which are matched to each other in coincidence of reference point, such as the center of gravity, the central point or any corner of a rectangle enclosing the character-pattern, the ration of a coincidence area (or the number of coincidence) of "black point" within two patterns to all the area (or all the number) of two patterns is employed as "a similarity factor" for recognizing two patterns.

By way of example, if it is assumed that one of characters $A$ and $B$ is the input characters and the other is the standard character, the similarity factor $r$ will be indicated as follows:

$$r=(A \cap B)/(A \cup B),\ 0 \leq r \leq 1 \qquad (1)$$

In an actual recognition operation, standard characters indicative of the similarity factor $r$ more than a predetermined threshold value are primarily selected, and a desired input character will be recognized by carrying out at least one further comparison operation as to a specified area or areas predetermined as "area of low similarity" in the selected standard characters.

As each of patterns of the standard characters, an average pattern obtained from a number of characters of the same kind is usually adopted. However, if the patterns of the standard character are determined as mentioned above, it is rare that the above-mentioned similarity factor $r$ between two coincidental patterns assumes a value "1" which means "complete coincidence" even if an input character having the same name as a standard character is applied. On the contrary, the similarity factor $r$ will frequently assume a value considerably close to the value "1" as to an input character different from an instant standard character.

An object of this invention is to provide a character recognition system capable of eliminating the above-mentioned disadvantages.

Another object of this invention is to provide a character recognition system capable of correctly recognizing input characters irrespectively of the thickness of line thereof.

Said objects and other objects of this invention can be attained by the character recognition system of this invention in accordance with pattern matching method, in which each of input patterns indicative of respective input characters to be recognized and a plurality of standard patterns indicative of respective standard characters are successively matched and compared there between with respect to the region to be compared, and the name of the respective input characters corresponding to the respective input patterns are determined successively in consideration of the results of the respective comparison operation, characterized in that for each of the standard characters, a first kind of standard pattern included substantially in all the same named characters and a second kind of standard pattern including substantially all the same named input characters are previously established, and that the result for each of the input characters is a ratio of a first measured value to a second measured value, the first measured value being an intersection between the input pattern and the first kind of standard pattern, the second measured value being the first kind of standard character plus an intersection between the input pattern and the negation of the second kind of standard character.

The system of this invention, as to its construction and operation together with other objects and advantages thereof, may best be understood by the following description, taken in connection with the accompanying drawings, in which the same parts are designated by the same characters, numerals and symbols as to one another, and in which.

Figure 1:
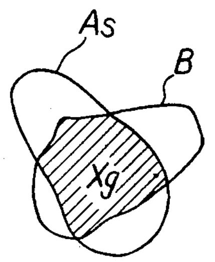
FIG. 1 shows matched patterns for describing the principle of the conventional recognition system.

The principle of this invention will be first described in comparison with the conventional pattern recognition system. If it is assumed that a pattern $As$ is a standard pattern and a pattern $B$ is an input pattern as shown in FIG. 1, these two patterns $As$ and $B$ are compared with each other in the matched condition of respective reference points with reference to the similarity factor ($r_1=(As \cap B)/(As \cup B)$ ). In this case, an intersection ($As \cap B$) corresponds to a hatched area included to both of two patterns $As$ and $B$, and a union ($As \cup B$) corresponds to an area included in either of two patterns $As$ or $B$ and given as an addition of the forementioned area ($As \cap B$) and of the remaining area. Accordingly, if two patterns $As$ and $B$ coincide completely with each other, the similarity factor $r_1$ assumes a value "1", but the factor $r_1$ assumes a valve zero to "1" in any other case. However, if an average pattern obtained from a number of characters of the same kind is adopted as the standard character, it is usually rare that the similarity factor $r_1$ assumes a value "1" even if the input pattern $A$ is included in the standard pattern $As$ or even if the standard pattern $As$ is included in the input pattern $A$. On the contrary, the similarity factor $r_1$ will frequently assume a value considerably closer to the value "1" as to input characters other than the input pattern "A".

If a similarity factor $r_2=(As \cap B)/As$ is adopted instead of the similarity factor $r_1=(As \cap B)/(As \cup B)$, the similarity factor $r_2$ between the input pattern $B$ and the standard pattern $As$ assumes a value "1" even if the input pattern $B$ does not completely coincide with the standard pattern $As$. In order to make the similarity factor $r_2$ between all of the input characters ($A$) and the standard pattern ($As$) equal substantially to a value "1", it is desirable that the standard pattern $As$ is established so as to be included in all the input patterns $A$. The standard pattern $As$ of this case established be established so as to be a pattern $A$ formed by thin lines. However, the adoption of this pattern of thin lines has such disadvantage that any of the input patterns assumes a condition "$r_2$=1" even if the input pattern includes the standard character.

In this invention, the above-mentioned disadvantages as to the similarity factors $r_1$ and $r_2$ can be eliminated, and the similarity factor for any of input characters $A$ formed by lines of different thickness assumes a value "1". In other words, a standard character is established so that a similarity factor as to an input character similar to the standard character assumes a value closer to the value "1" and so that a similarity factor as to an input character dissimilar to the standard character assumes a value further from the value "1".

Figure 2:
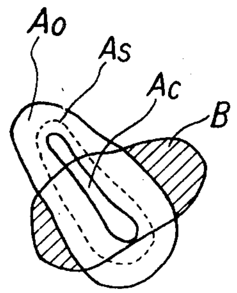
FIG. 2 shows matched patterns for describing the principle of the recognition system of this invention.

Although the standard character $As$ of the conventional systems is usually established in accordance with the frequency distribution of respective points on the patterns matched with respect to reference points, the standard character of this invention consists of a core part *Ac* and an outside part *Ao* enclosing the core part *Ac* as shown in FIG. 2. The core part *Ac* is formed by points only assuming a frequency 100 percent or a frequency nearly equal to a value 100 percent. On the other hand, the outside part *Ac* is determined so as to include all the input characters *A* but to occupy a minimum region. Moreover, the similarity factor $4_a$ of this invention is determined as follows:

$$r_a=\frac{(Ac\cap B)}{(Ac)+\{B\cap(Ao\oplus B)\}} \qquad (2)$$

where $$0\leq r_a\leq 1$$

The numerator of the right side corresponds to an intersected parts of the core part *Ac* and of the character *B*, and the denominator of the right side corresponds to an addition of the core part *Ac* and of a part of the character *B* other than the outside part *Ao*. In the equation (2), "∩" shows "logical product" and "⊕" shows "exclusive or".

The equation (2) can be rewritten as follows:

$r_a=(Ac\cap B)/(Ac)+(Ao\cap B)$ (3) As understood from the equations (2) and (3), all the input character, such as the characters *As* in FIG. 2, including the core part *AC* and having no part projected from the outside part *Ao* give the condition: *fa*=1. However, all of the input characters including the core part *Ac* but having a part projected from the outside part *Ao* will give the condition: $r_a<1$. These mean that all the input characters having the same name as the standard character to be compared therewith will give the condition: $r_a\simeq 1$ but other input characters will give a similarity factor $r_a$ clearly distinct from a value "1". In other words, it is possible according to this invention that input characters like to standard character to be compared therewith will be deemed as more like characters and input characters unlike to the standard character to be compared therewith will be deemed as more unlike characters.

Figure 3:
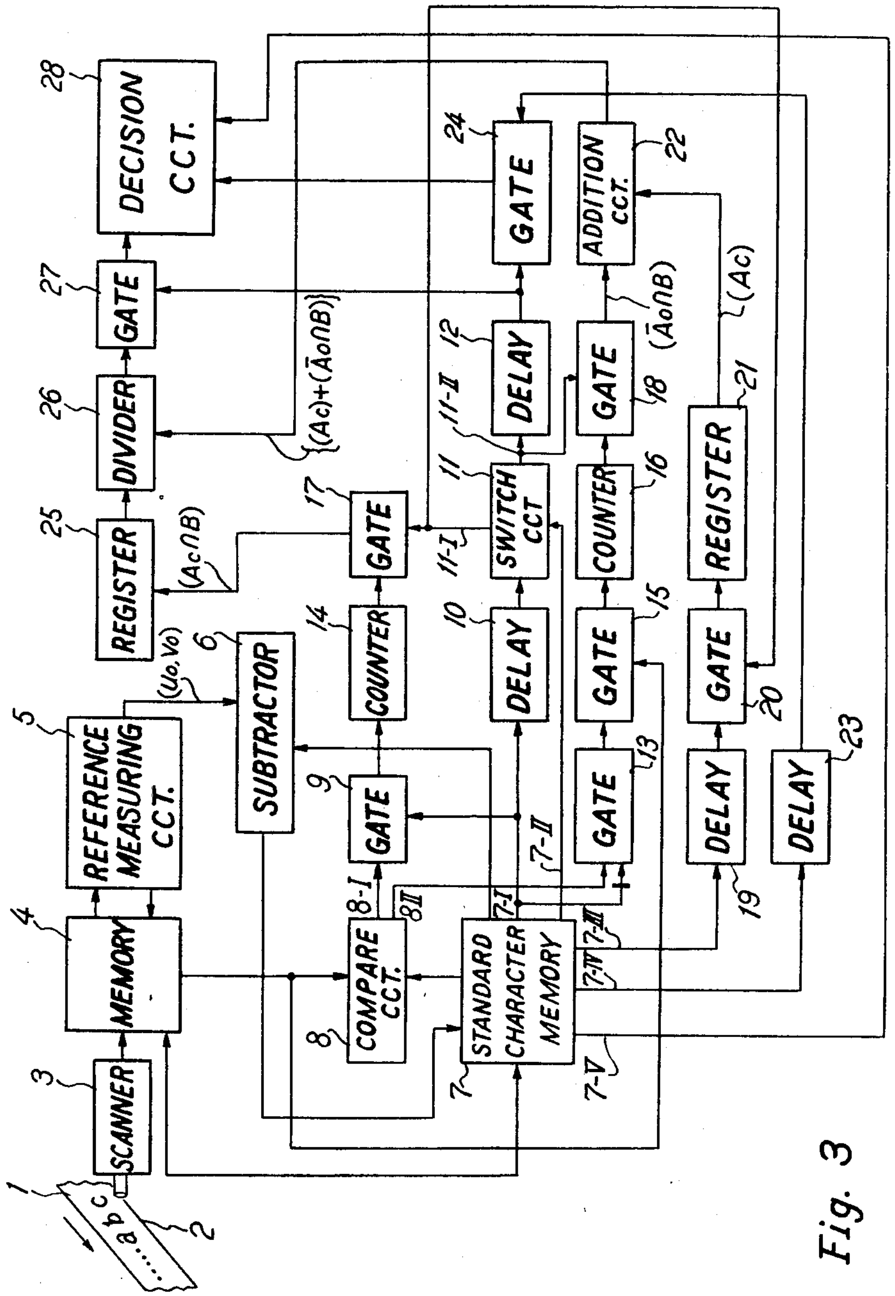
FIG. 3 is a block diagram for illustrating an embodiment of this invention.

An embodiment of this invention will now be described with reference to FIG. 3. In this embodiment, input characters 2 printed, typewirtten or handwritten on a document 1 are scanned by a photoelectric scanner 3. By this scanning, black points and white points of each of the input character 2 are converted to an electric signal, which is sampled by sampling pulses to produce a pulse train comprising pulses "1" of black points and pulses "0" of white points. The pulse train is applied to a memory 4, which is a core matrix by way of example. A reference measuring circuit 5 determines a reference point for pattern matching, such as an intersection point between a vertical line and a horizontal line of a rectangular enclosing the input pattern, a center point of the input pattern (an intersection between respective bisectors of the vertical and horizontal lines), an intersection between horizontal and vertical bisectors of pattern area, and the center of gravity of the input character. If the center of gravity is to be determined, the abscissa $u_o$ and the ordinate $v_o$ of the center of gravity indicated as follows are measured in the circuit 5.

$$u_0=\sum_{i=1}^{m}iMi\Big/\sum_{i=1}^{m}Mi \qquad (4)$$

$$v_0=\sum_{i=1}^{n}jNj\Big/\sum_{i=1}^{n}Nj \qquad (5)$$

where, "*m*" and "*n*" are respectively the number of columns and the number of rows in the memory 4, and *Mi* and *Nj* are respectively the numbers of "1" (i.e.; "black points") on row lines *and j*. Accordingly, in case of reading out the contents of the memory 4 in the vertical direction and in the horizontal direction, the coordinates $u_o$ and $v_o$ are obtained by multiplications, addition and division as to the respective order numbers of all columns and all rows and the numbers of "1" included in the corresponding columns and rows. The reference measuring circuit 5 is composed of multiplication circuits, addition circuits and division circuits to carry out the above operation. The coordinates of the center of gravity of the input character which is measured in the reference measuring circuit 5 is applied to a subtractor 6.

In a standard character memory 7, are semipermanently stored all the patterns of standard characters, respective coded names of the standard characters and coordinates $x_o$, $y_o$ of the center of gravity of each of the standard characters. These coordinates $x_o$, $y_o$ are applied also to the subtractor 6.

Figure 5:
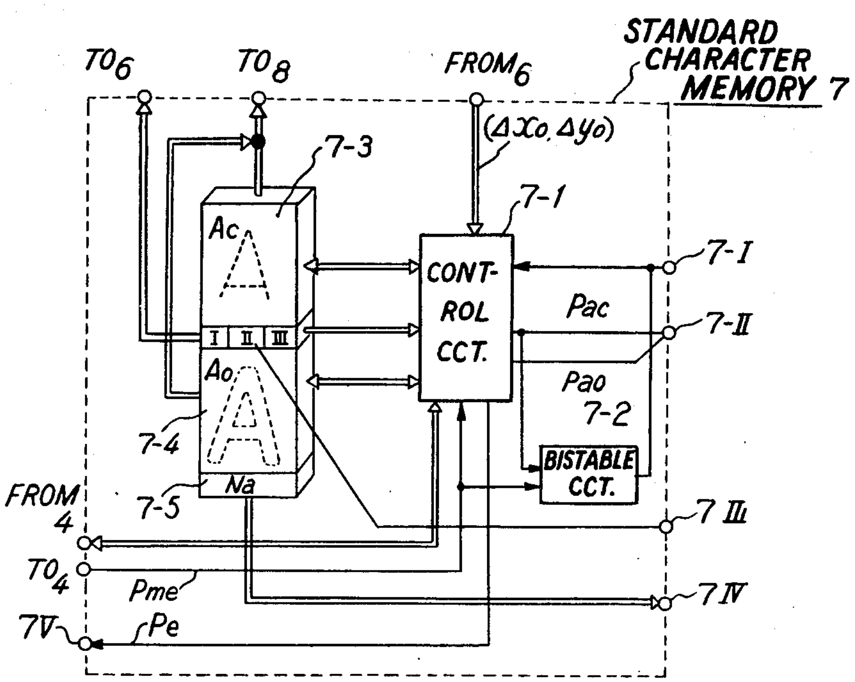
FIG. 5 is a block diagram for illustrating an example of a standard character memory to be employed in the system of this invention.

In the standard memory 7, two kinds of standard patterns stored for each of the standard characters as are shown for a standard character "*A*" in FIG. 5. One of them is a thin core part *Ac* which will be substantially included in all of the same named input characters, and the other is an outside thick part *A*. in which all patterns of the same named input characters are included and which occupies a minimum area. With respect to the above-mentioned two kinds of standard patterns, coordinates of the reference point common to the two standard patterns are predetermined. The coordinates $x_o$, $y_o$, $u_o$, and *vo* are applied to the subtractor 6 from the circuits 5 and 7, and operations "$x_o-u_o=\Delta x_o$" and "$y_o-v_o=\Delta y_o$" are carried out in the subtractor 6. The result ($\Delta x_o$,$\Delta y_o$) of these operations is fed back to the standard character memory 7.

In this case, the standard character memory 7 carries out the transformation of coordinates so as to match the center of gravity of the input character with the center of gravity of a standard character. This transformation of coordinates is performed by parallel movement of the coordinates of the input character stored in the memory 4 by a value $\Delta x_o$ along the horizontal direction and by a value $\Delta y_o$79 along the vertical direction. Accordingly, a point (designated by coordinates *x,y*) on the standard character is matched with a point (designated by coordinates $u+\Delta x_o$, $v+\Delta_o$) on the input character.

Next, coincidences of "black point" (i.e., the intersection $Ac\cap B$) between the input character *B* and the first kind of standard character *Ac* are searched and thereafter incoincidences of "black point" (i.e., the intersection $\overline{Ao}\cap B$) between the input character *B* and the second kind of standard character *Ao* are also searched. The above-mentioned coincidence-and-incoincidence operations are carried out in a compare circuit 8. In this case, if matched points (meshes) on the standard character *Ac* or *Ao* and the input character coincide with each other as to "black point", a coincidence pulse is produced at a terminal 8–I of the compare circuit 8. On the contrary, if the matched points (meshes) do not coincide with each other as to "black point", an incoincidence pulse is produced at a terminal 8–II of the compare circuit 8. The standard character memory 7 is provided with a bistable circuit, which at a terminal 7–I produces an output "1" in case of matching the input character *B* and the first kind of standard character *Ac* and produces an output "0" in case of matching the input character *B* and the second kind of standard character *Ao*. The output pulse of the terminal 7–I is applied to a gate 9 as it is, to a switch circuit 11 through a delay circuit 10, and to a gate 13 after negation. Accordingly, if a pulse is generated at the terminal 7–I, the gate 9 is opened so that the number of the coincidence pulses generated at the terminal 8–I is counted by a counter 14. On the contrary, while the output pulses of the memory 4 are applied to a gate 15 so as to open it, the incoincidence pulses generated at the terminal 8–II cannot be passed through the gate 13 since this gate 13 is closed.

At a time when the compare operation between the characters *Ac* and *B* is performed, an end pulse *Pac* indicative of the end of the compare operation on the character *Ac* is produced at the terminal 7–II and applied to the switch circuit 11. This switch circuit 11 is designed so that the output of the terminal 7–II of the standard character memory 7 is switched to a terminal 11–I or 11–II in accordance with the states "1" and "0"

of the pulse of the terminal 7–I of the standard character memory 7 respectively. At this instant, although the state of the bistable circuit is the memory 7 (i.e., the pulse at the terminal 7–I) changes from the state "1" to the state "0" in response to the end pulse *Pac*, the switch circuit 11 still selects the terminal 11–I since the end pulse *Pac* is delayed in the delay circuit 10. Accordingly, the end pulse *Pac* is applied, from the terminal 11–I, to a gate 17 and a gate 20. The gate 17 passes therethrough the contents of the counter 14 (i.e., the number of coincidences in "black point" between the characters *Ac* and *B*) and applies then to a register 25. The gate 20 opened by the output of the switch circuit 11 passes therethrough, to a register 21, the total number of "black points" of the character *Ac* which has been applied from a terminal 7–III through a delay circuit 19, and it applies to a terminal of an addition circuit 22. On the other hand, the content of the register 25 is applied to a divider 26 as a dividend.

Just after a time when the compare operation between the first kind of standard character *Ac* and the input character *B* has been performed, the compare operation between the second kind of standard character *Ao* and the input character *B* is started. In this case, since the bistable circuit of the memory 7 is reset to the state "0" and the gates 9 and 13 are therefore closed and opened respectively, only the incoincidence pulses from the terminal 8–II are passed through the opened gate 13 and applied to one terminal of the gate 15. At the same time, the same pattern information as the input of the compare circuit 8 is applied to the other terminal of the gate 15. Accordingly, the output pulses of the gate 15 in this case assume the number indicative of an area of the second kind of standard character *Ao* excluding from the input character *B*, and the number of these pulses is counted at the counter 16.

At a time when the compare operation between the second kind of standard character *Ao* and the input character *B* has been carried out, an end pulse *Pao* indicative of the compare operation on the standard character *Ao* is produced at the terminal 7–II and applied to the switch circuit 11. At this time, since the switch circuit 11 selects its output 11–II in accordance with the state "0" of the pulse of the terminal 7–I, the end pulse *Pao* passes through the terminal 11–II to the gate 18. Accordingly, the content of the counter 16 is read out and applied through the opened gate 18 to the addition circuit 22, in which contents of the counter 16 and the register 21 are added to each other. The result of this addition is applied to the divider 26 as a divisor. From the divider 26, the intersection $AC \cap B$) divided by the intersection (AC) +(Ao$\cap B$) is given as the similarity factor $r_a$. This result $r_a$ is passed through agate 27 which is opened by the gate pulse *Pao* passed through a delay circuit 12 from the terminal 11–II, and it is applied to a decision circuit 28. A coded $r_a$of the second kind of standard character *Ao* which is produced at a terminal 7–IV of the memory 7 is passed through a delay circuit 23 and a gate 24 opened to the decision circuit 28.

Similarly as the operation mentioned above, the compare operations of an input characters (B) with all of the standard characters stored in the standard character memory 7 are successively carried out, and the similarity factor $r_a$ for respective compare operations and the coded names of the standard characters are successively applied to the decision circuit 28. The decision circuit 28 determines the name of the input character in consideration of the similarity factor $r_a$ applied. This decision operation can be carried out in any principle.

Figure 4A:
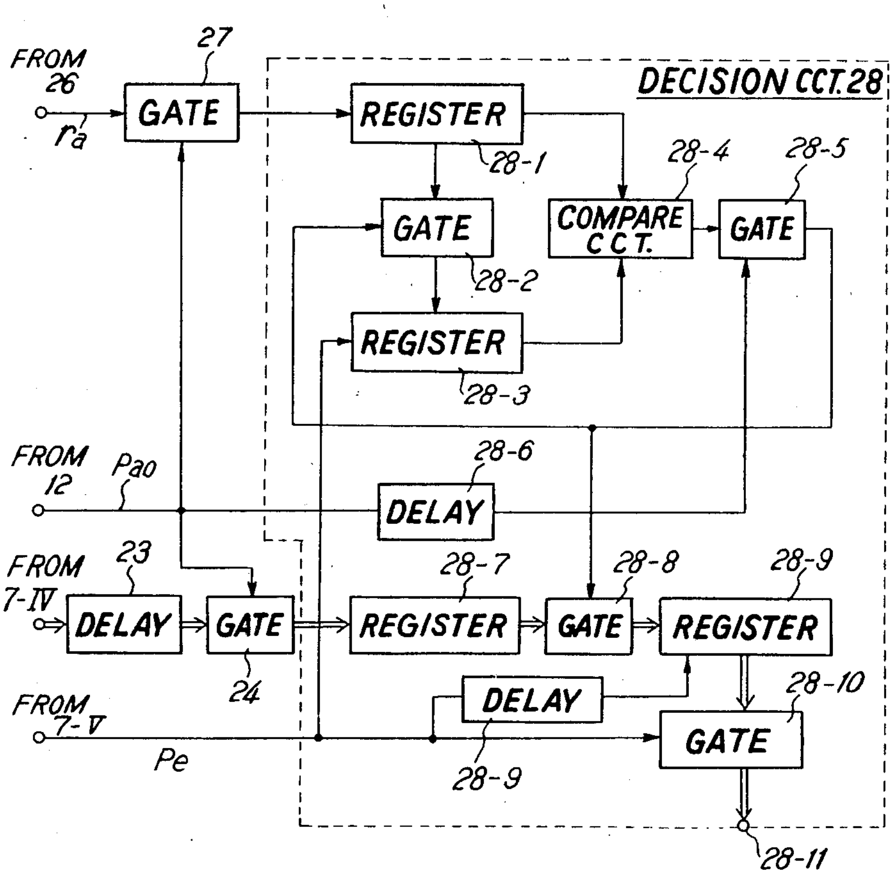
FIGS. 4A and 4B are block diagrams each for illustrating an example of a decision circuit to be employed in the system of this invention.

An example of the decision circuit 28 will be described with reference to FIG. 4A. If a compare operation between an input character and a standard character has been performed, an input character and a standard character has been performed, the result rtjd a indicative of the similarity factor and derived from the divider 26 is applied, through the gate 27 opened by the end pulse *Pao*, to a register 2814 1 and stored in this register 28–1. Moreover, the coded name of the instant standard character is passed through the delay 23 and the gate 24 opened by the end pulse *Pao*, to a register 28–7 and stored in this register 28–7. In this case, the result $r_a$ stored in the register 28–1 is compared at a compare circuit 28–4 with a result *ra* stored previously in a register 28–4 w as mentioned below. If the result $r_a$ stored in the register 28–1 is of a first input character, the content of the register 28–3 assumes the state "0". The compare circuit 28– 4 produces an output "1" when the content of the register 28–1 is larger than the content of the register 28–3. If it is assumed that the above-mentioned condition is now satisfied, the output "1" of the compare circuit 28–4 is applied to a gate 28–5. In this case, the end pulse *Pao* is being applied, through a delay circuit 28–6, to the gate 28–5 to open it. Accordingly, the output "1" of the compare circuit 28- 1 is passed through the opened gate 28–5 and applied to both of gates 28–2 and 28–8. In response to the opening of the gate 28–2, the content of the register 28–1 is transferr- l to the register 28–3. At the same time, the content of the r ister 28–7 is transferred to a register 28–9 in response to the opening of the gate 28–8.

Next, the result $r_a$ obtained from the just succeeding compare operation is transferred to the register 28–1, and the coded name of the standard character just compared is transferred to the register 28–7. In this case, if the content of the register 28–1 is smaller than the content of the register 28–3, the compare circuit 28–4 produces an output "0". Accordingly, the end pulse *Pao* cannot be passed through the gate 28–5 so that the content of the register 28–3 is not changed.

If the compare operations of the input character with each of the standard characters preestablished in the standard character memory 7 have been carried out, the registers 28–3 and 28–9 have respectively the result $r_a$ of the highest similarity factor and the coded name corresponding to the standard character which has the highest similarity factor. At this time, an end pulse *Pe* is produced from a terminal 7–V of the memory 7 and applied to a gate 28–10 and a delay circuit 28–9. Accordingly, the coded name stored in the register 28–9 is read out, through the opened gate 28–10, to an output terminal 28–11. This end pulse *Pe* is also employed to drive a travelling device of the document 1 so as to shift it by a step until the just succeeding input character.

Figures 6A, 6B, 6C:
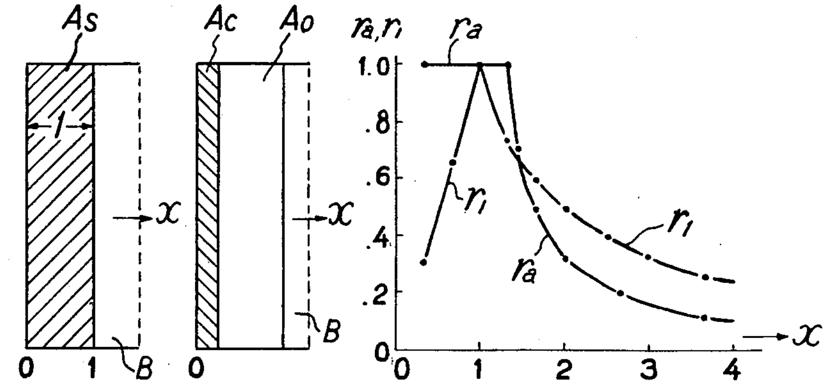
FIGS. 6A and 6B are pattern characteristics for describing the feature of this invention in comparison with the conventional system.
FIG. 6C shows characteristic curves for describing the merits of this invention in comparison with the conventional system.

With reference to FIG. 5, the construction and operation of the standard character memory 7 will now be described. The standard character memory 7 comprises, by way of example, an *Ac* memory 7–3, and an *Ao* memory 7–4, a label memory 7–5, a control circuit 7–1 and a bistable circuit 7–2. If an input character has been stored in the memory 4, an end pulse *Pme* indicative of the end of storing the input character is applied from the memory 4 to the control circuit 7–1 and, at the same time, sets the bistable circuit 7–2 to the state "1". The state "1" of the bistable circuit 7–2 means that the system is carrying out the compare operation on the first kind of standard character *Ac*. The control circuit 7–1 comprises a clock pulse generator for timing the entire system, a distributor for reading out the standard character *Ac* or *Ao* stored in the memories 7–3 and 7–4 into the compare circuit 8, counter for controlling the distributor, and other logical circuits necessary for the compare operation. When the control circuit 7–1 receives the end pulse *Pme*, the control circuit 7–1 sends out the coordinates $u_o$, $v_o$ of the center of gravity of the standard character from the additional part I of the *AC* memory 7–3 to the subtractor 6. At the same time, the control circuit 7–1 receives the forementioned difference ($\Delta x_o$, $\Delta y_o$) between the coordinates ($x_o$, $y_o$and ($u_o$, $v_o$) from the subtractor 6. In an additional part III of the *Ac* memory 7–3, values of the vertical region and the horizontal region on the standard character *Ac* are stored. After the forementioned transformation of coordinates ($\Delta x_o$, $\Delta y_o$) is carried out as to the above-mentioned region of the standard character *Ac*, respective matched points on the patterns B and *Ac* are simultaneously read out from the memories 4 and 7–3 respectively and applied to the compare circuit 8. When the characters *Ac* and *B* have been read out, a counter in the control circuit 7–1 produces the end pulse *Pac* at the terminal 7–II. The pulse *Pac* resets the bistable circuit 7–2 to the state "0" and is applied to the switch circuit 11 through the terminal 7–II. In response to the reset of the bistable circuit 7–2, the compare operation between the same input character *B* an the second kind of standard character *Ao* is carried out with respect to the region of the input character *B*. The control circuit 7–1 detects the region of the input character *B* in the operation processes of storing and shifting the input character *B*. WHen the compare operation on the second kind of standard character *Ao* has been performed, the end pulse *Pao* is applied from the terminal 7–I to the switch circuit 11. At the terminal 7–III, the total number "black points" of the standard character *Ac* is generated. The coded name of the second kind of standard character *Ao* shapes applied from the label characters 7–5 . Figure terminal 7–IV. The end pulse *Pe*Ac, is applied from the control circuit 7–1 to the terminal 7–V. $r_1$ The characteristic of the system according to this invention will be described with respect to FIGS. 6A, 6B and 6C in comparison with the conventional system. Fig. 6A shows a half (right side) of a standard character *As* FIG. and a half (right side) of an input character *B* matched with the character *As* in accordance with a conventional system. .For simple illustration, a character similar to the character "1" or "*I*" is employed by way of example. In these Figures, the side contour of the input character *B* is shown by a dotted line and the width *x* of the input character *B* is deviatable along the horizontal direction according to the shapes of the respective input characters *B*. Figure 6B shows respective halves of the characters *Ac*, *Ao* and *B* similarly as FIG. 6A. The similarity factors $r_1$ of the conventional system ans the similarity factor *ra* of this invention respectively obtained from FIGS. 6A and 6B are illustrated in FIG. 6C by employing the width *x* as variable. As understood from FIG. 6C, the factor $r_1$ assumes a value "1" only at a condition where the width *x* is equal to the width "1" of the character *As*. On the contrary, the factor $r_a$ of this invention assumes a value "1" within the width of the character *Ao*. At the region in excess of the width of the character *As*, while the factor $r_1$ decreases slowly, the factor $r_a$ of this invention decreases fast after holding the value "1" within the width of the character *Ao*. Accordingly, standard characters like to the input character and other standard characters unlike to the input characters can be distinctly recognized in the system of this invention.

The system of this invention is able to select the name of the standard character like the input character. However, the condition: $r_a$=1 is satisfied for a region of the pattern *Ao* except the pattern *Ac*. Accordingly, if an standard character (e.g. I(or I)) different from an input character (e.g., I(or 1)) is included in the above-mentioned region, the decision circuit 28 shown in FIG. 4A will determine erroneously the name of the input character. To eliminate such disadvantage, the system of this invention is able to adopt another type of the decision circuit. By way of example, a group of standard characters corresponding to the similarity factors $r_a$ more than a predetermined threshold value (e.g., 70 percent) may be selected, and the similarity between each of the group of standard characters and the input character may be searched as to a specified area of pattern at which each of the standard characters in the group is different from other standard character or characters. By repeating such research operation or operations of similarity until the group is composed of a single standard character, the name of the input character can be correctly determined.

Figure 4B:
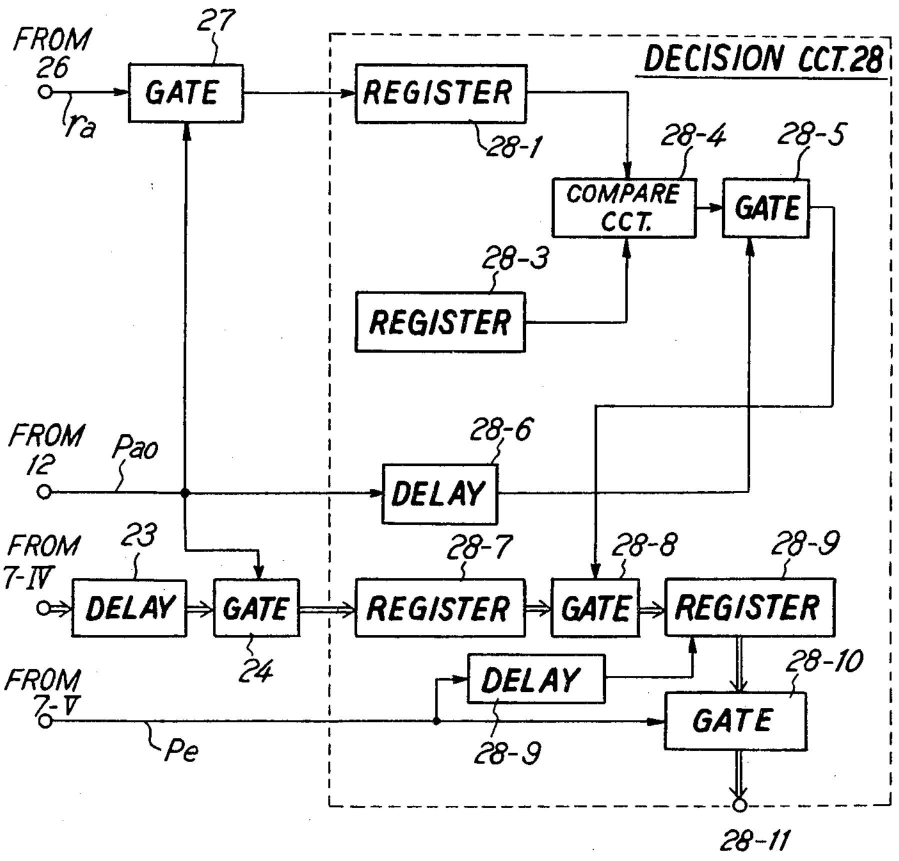

FIG. 4B shows an example of the decision circuit to realize the above-mentioned principle. In this example, the threshold value is stored in the register 28–3 and the register 28–9 is designed so that a plurality of coded names for the group of standard character can be stored in it. Accordingly, if any standard character has the similarity factor $r_2$ exceeding the threshold value, the coded name (label) of its standard character is transferred to the register 28–9 to form the group of similar standard characters. In response to the end pulse *Pe*, the names stored in the register 28–9 are read out to the terminal 28–11. In this case, the patterns *Ac* and *Ao* established in the standard character memory 7 are replaced by respective specified parts of patterns ti AC and ti A0 at which each character in the group of similar standard characters is different from one another. The succeeding compare operation is carried out as to the specified parts. In this case, either of the decision circuits shown in FIGS. 4A and 4B may be employed. If necessary, the compare operation is again carried out as to more limited-specified parts.

While we have described particular embodiments of our invention, it will or course be understood that we do not wish our invention to be limited thereto, since many modifications and changes may be made and we, therefore, contemplate by the appended claims to cover all such modifications as fall within the true spirit and scope of our invention.

What we claim is:

1. A pattern matching character recognition system, comprising:
means for scanning input characters to be recognized;
a first memory means for storing, for each of all input characters to be recognized, a first standard pattern included substantially in respective patterns of all the same named input characters;
a second memory means for storing, for each of all the input characters to be recognized, a second standard pattern including respective patterns of all the same name input characters;
a first measuring means for measuring an instant one of the input characters and each of the first standard patterns in a pattern matching condition therebetween to obtain, for each of the first standard patterns, a first measured value indicative of a coincidence area between said instant one of the input characters and each one of said first standard patterns;
a second measuring means for measuring an instant one of the input characters and each of the second standard patterns in a instant one matching condition therebetween to obtain, for each pair of the first and second standard patterns determined for the same input character, a second measured value indicative of a sum of the area of the first standard pattern of said each pair of the first and the second standard patterns and a noncoincidence area between said instant one of the input characters and the second standard pattern of said each pair of the first and second standard patterns; and
a decision circuit means for determining successively names of the input characters in accordance with ratios of each of the first measured values to one of the second measured values corresponding to said each of the first m measured value.

2. A pattern matching character recognition system according to claim 1, in which said first measuring means comprises means for determining a reference point for each input character.

3. A pattern matching character recognition system according to claim 1, in which said first standard patterns are light line representation of the corresponding standard characters and said second standard patterns are heavy line representations of said standard characters.

4. A pattern matching character recognition system according to claim 1, in which said first and second memory means include a bistable circuit producing at an output terminal an output "1" in case of matching an input character with a standard pattern of said first standard patterns and an output "0" in case of matching an input character with a standard pattern of said second standard patterns.